Jan 6, 1931.  H. W. HORNKE  1,787,862
FISH NET FLOAT
Filed March 6, 1929
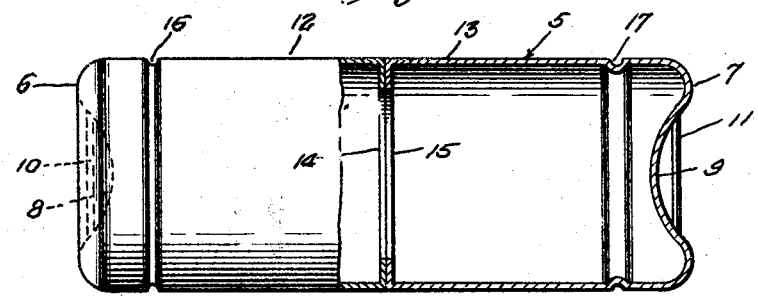
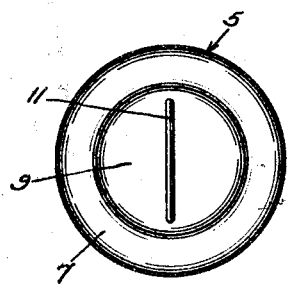
Inventor
Hugo W. Hornke,
By Clarence A. O'Brien
Attorney Patented Jan. 6, 1931

1,787,862

UNITED STATES PATENT OFFICE

HUGO W. HORNKE, OF CLEVELAND, OHIO

FISH-NET FLOAT

Application filed March 6, 1929. Serial No. 344,740.

This invention relates to floats for fish nets.

One of the objects of the invention is to provide, in a manner as hereinafter set forth, a device of the character referred to, which is formed of material having a greater specific gravity than water, such as metal or the like, so as to provide a float which will stand the wear and tear of hard usage in fishing tackle.

Another object of the present invention is to provide a sectional float that will promote economy of manufacture, while at the same time utilize the sectional feature thereof as a reinforcing member for the body of the float.

Another object of the invention is to provide a reinforcing member integral with the body of the float adjacent each end to prevent crushing of the body under ordinary wear and tear, and furthermore to provide an attaching means at each end of the float handy for attaching lines while at the same time preventing fouling of the lines of the fishing tackle.

Further objects of the invention are to provide, in a manner as hereinafter set forth, a device of the character described, which is strong, durable and compact, highly efficient for its intended purpose, having a body which is not deteriorated by water, that is capable of storage in the minimum of space, very light to handle, the structure of which promotes a very simple method of assembly and comparatively inexpensive to manufacture.

With the foregoing and other objects in view, the invention consists of a novel construction, combination and arrangement of parts, as will hereinafter be more specifically described and illustrated in the accompanying drawings, wherein is shown an embodiment of the invention, but it is to be understood that changes, variations and modifications may be resorted to without departing from the spirit of the claims hereunto appended.

In the drawings wherein like reference characters denote corresponding parts throughout the several views:

Figure 1 is an elevation of the device in accordance with this invention partly in section, Figure 2 is an end elevation thereof.

Referring to the drawings in detail wherein is shown an embodiment of the invention, 5 indicates generally a tubular body portion formed of metal or other material capable of withstanding wear and tear of fishing without breaking, but while at the same time being of a greater specific gravity than water.

The body portion 5 is provided with closed annular end walls 6, 7 having cup shape cavities 8, 9 concaved with respect to the end wall. Cylindrical rods 10, 11 are secured at their opposite ends to the end walls 6, 7 extending diametrically of the body portion and in spaced relation to the cavities 8, 9.

The cylindrical rods aforementioned provide attaching means for securing the ends of the fish net line not shown in the drawings and by reason of the spacing and cylindrical cross section, the attaching means will not foul the fish line tackle. The tubular body portion 5 is formed of two sections 12, 13 having the end walls, above described at the opposite ends thereof and the adjacent ends of each section 12, 13 formed with inwardly directed annular flanges 14, 15 which are adapted to abut each other.

The flanges extend radially with respect to the body portion 5 and when in assembled condition, in abutting relation form a means of securing the two sections together by welding or other securing means.

In addition to forming the securing means for the respective sections, the annular flanges 14, 15 are being turned inwardly to form reinforcements for the entire body portion 5 intermediate the ends thereof.

Adjacent the opposite ends, the body portion 5 is formed with inwardly directed annular channels 16, 17 as circumventing the body portion 5. The channels 16, 17 are formed by compressing the body portion in a semi-circular configuration so as to provide reinforcing ribs adjacent the end of the body to withstand the wear and tear on the ends of the float.

In the application of the invention, and particularly in the method of assembling, the two sections 12, 13 may be stamped in one operation and welded as an accessory thereto. It will be apparent that the stamping and assembly of the float in accordance with this invention promotes economical and speedy production of the finished article.

The flanges 14, 15 may be bent inwardly and the reinforcing ribs 16, 17, while the concavities 9, 10 may be formed by stamping in a die whereupon the sections of the body portion 5 may be fabricated in one operation. The respective sections will then be placed with the flanges in abutment whereby the flanges and respective sections are secured together by a method of spot welding. At the same time the flanges are being spot welded, the attaching members 10, 11 may also be spot welded to the end walls thereby promoting economical manufacture and a very simple method of assembly.

It is to be noted that the float is formed of metal which is heavier than water while at the same time adding sufficient rigidity and resistance to the wear and tear so as to make a very practical float capable of withstanding the rough usage in the fishing industry.

Having thus described my invention, what I claim as new is:

1. In a fish net float, comprising a body portion formed of material having a greater specific gravity than water, said body portion formed of hollow tubular configuration having closed end walls, reinforcing members formed integral with said body portion intermediate of and adjacent the ends thereof, said end walls provided with cup shaped cavities, and an attaching means secured to said end walls and extending diametrically of said body in spaced relation to the bottom of said cavity, said body portion including a pair of sections having inwardly directed flanges on adjacent ends thereof and said sections secured together with opposed faces of the flanges in abutment to provide reinforcements intermediate the ends of said body.

2. In a fish net float, comprising a body portion formed of material having a greater specific gravity than water, said body portion formed of hollow tubular configuration having closed end walls, reinforcing members formed integral with said body portion intermediate of and adjacent the ends thereof, said end walls provided with cup shaped cavities, and an attaching means secured to said end walls and extending diametrically of said body in spaced relation to the bottom of said cavity, said body portion including a pair of sections having inwardly directed flanges on adjacent ends thereof and said sections secured together with opposed faces of the flanges in abutment to provide reinforcements intermediate the ends of said body, said reinforcing members comprising annular members extending inwardly from the outer surface of said body portion.

3. In a fish net float, comprising a body portion formed of material having a greater specific gravity than water, said body portion formed of hollow tubular configuration having closed end walls, reinforcing members formed integral with said body portion intermediate of and adjacent the ends thereof, said end walls provided with cup shaped cavities, and an attaching means secured to said end walls and extending diametrically of said body in spaced relation to the bottom of said cavity, said body portion including a pair of sections having inwardly directed flanges on adjacent ends thereof and said sections secured together with opposed faces of the flanges in abutment to provide reinforcements intermediate the ends of said body, said reinforcing members comprising annular members extending inwardly from the outer surface of said body portion, said attaching means consisting of a cylindrical rod secured at its opposite ends to said end wall.

In testimony whereof I affix my signature.

HUGO W. HORNKE.